E. HATCH, DEC'D.

BY F. A. DOUTY, ASSIGNEE.

BUNDLING MACHINE.

APPLICATION FILED SEPT. 14, 1920.

Reissued Nov. 7, 1922.

15,486.

4 SHEETS—SHEET 1.

Inventor

Edward Hatch, by

T. A. Witherspoon

Attorney

E. HATCH, DEC'D.

BY F. A. DOUTY, ASSIGNEE.

BUNDLING MACHINE.

APPLICATION FILED SEPT. 14, 1920.

Reissued Nov. 7, 1922. 15,486.

4 SHEETS—SHEET 2.

Inventor

Edward Hatch, by

T. A. Witherspoon

Attorney

E. HATCH, DEC'D.
BY F. A. DOUTY, ASSIGNEE.
BUNDLING MACHINE.
APPLICATION FILED SEPT. 14, 1920.

Reissued Nov. 7, 1922. 15,486.

4 SHEETS—SHEET 3.

Inventor
Edward Hatch, by
T. G. Witherspoon
Attorney

E. HATCH, DEC'D.
BY F. A. DOUTY, ASSIGNEE.
BUNDLING MACHINE.
APPLICATION FILED SEPT. 14, 1920.

Reissued Nov. 7, 1922. 15,486.

4 SHEETS—SHEET 4.

Inventor
Edward Hatch, by
T. A. Witherspoon
Attorney

Reissued Nov. 7, 1922. Re. 15,486

UNITED STATES PATENT OFFICE.

EDWARD HATCH, DECEASED, LATE OF PORTLAND, OREGON, BY FRED A. DOUTY, OF PORTLAND, OREGON, ASSIGNEE; SAID DOUTY ASSIGNOR TO ALEC J. GERRARD, OF CHICAGO, ILLINOIS.

BUNDLING MACHINE.

Original No. 1,300,166, dated April 8, 1919, Serial No. 177,711, filed June 29, 1917. Application for reissue filed September 14, 1920. Serial No. 410,325.

*To all whom it may concern:*

Be it known that EDWARD HATCH, deceased, late a citizen of the United States, and resident of Portland, in the county of Multnomah and State of Oregon, invented certain new and useful Improvements in Bundling Machines, of which the following is a specification.

This invention relates to bundling machines, and has, especially, reference to an improved wire twisting or tying machine.

The invention has for its object to provide a wire twisting or tying machine for use in bundling operations, whereby the ends of the tying wire will be positively connected by twisting the same upon each other, thus providing a strong and durable bond therebetween.

It is a more specific object of the invention to provide a machine of the character mentioned whereby various objects can be arranged in piles, a tying wire being passed thereabout, the piles compressed, and the ends of the tying wire positively connected by twisting, while the wire is under tension, and upon the completion of the twisting operation the tying wire then automatically severed from the said strip and released together with the bundle.

Another object of the invention is to provide novel means for compressing the matter to be bundled and holding the same compressed during the tying of the wire, whereupon it is released for removal from the machine.

Still another object of the invention is to provide a machine with means whereby the tying wire ends will be securely held during the twisting of the same, but when twisted will be automatically released.

Other objects of the invention are to provide certain features of construction of the machine which will facilitate the attainment of the above objects.

The invention accordingly consists in the novel features of construction and combinations of parts which will be more fully hereinafter disclosed and particularly pointed out in the claims.

Referring to the accompanying drawings forming a part of this specification, and in which there is illustrated one of various possible embodiments of the invention—

Figure 10 is a fragmentary detail view in perspective showing a portion of the means for actuating the bundle compressing part of the machine.

Figure 1:
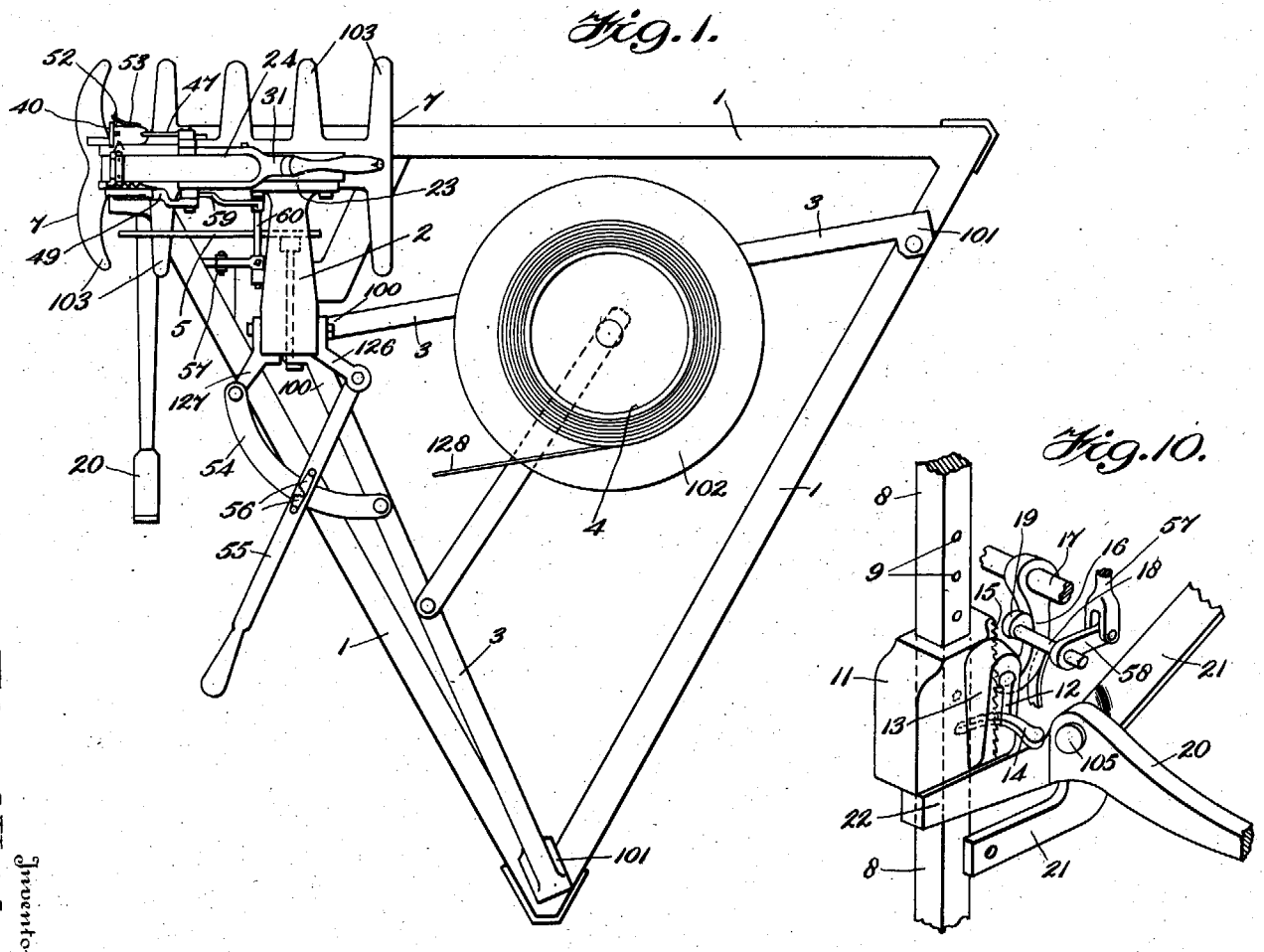
Figure 1 is a top plan view of a portion of the parts of the bundling or tying machine.

Referring to the drawings, the improved machine includes a lower frame 1, triangular in form. A supporting pillar 2 is arranged in proximity to one of the corners of the frame 1, see Figures 1 and 2, and serves as a means for supporting the wire twisting head 24 hereinafter more fully described. Supporting bars 3 having their upper ends 100 secured to the upper end of the pillar 2, and their lower ends 101 secured to the frame 1, adjacent its corners are provided; and as will be noted, one of the said bars 3 serves to support a wire receiving and feeding reel 4, this reel being rotatably supported upon a suitable table 102. A combined guard and guide plate 5, Figure 1, is secured to the supporting pillar 2, and has its lower extremity slotted, as indicated at 6, Figure 2, whereby the laterally extending fingers 103 of a bundle supporting rack 7 may be slidably received therebetween; this rack 7 being in turn secured to the upper end of a standard 8, formed of squared metal and having its lower end provided with a series of openings 9. The lower end of the squared standard 8 is slidably received through a guide member or bracket 10 disposed upon the adjacent leg 104 of the frame 1.

Figure 2:
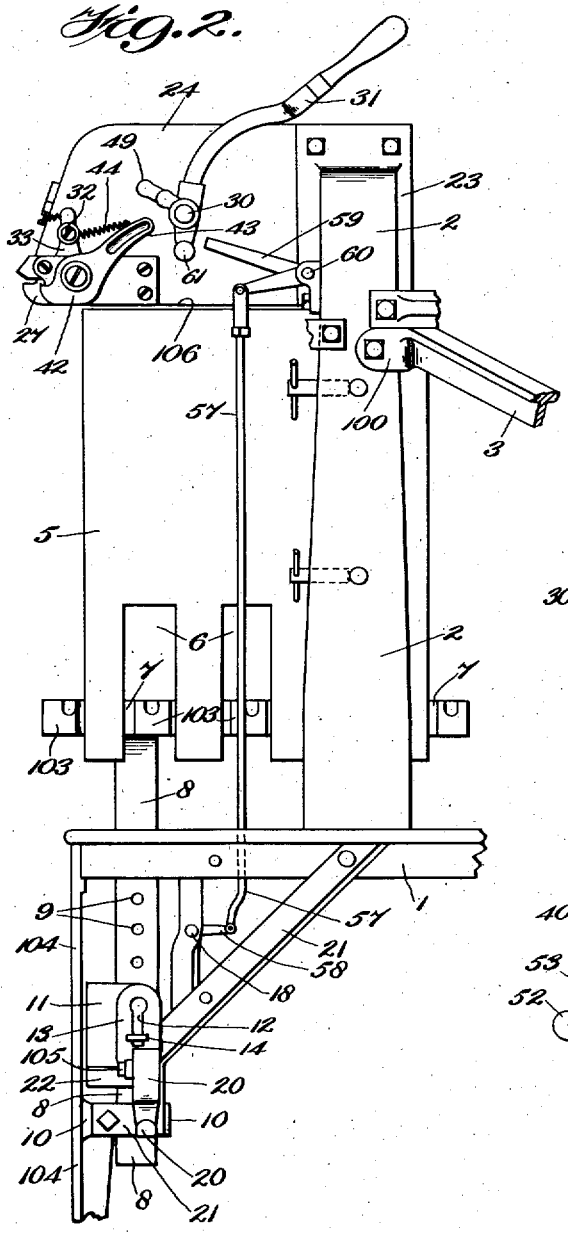
Figure 2 is a fragmentary side elevational view of a portion of the parts shown in Figure 1.

Slidably mounted on the lower extremity of the standard 8 is the collar member 11 having an opening 12 formed in one side thereof, this opening being surrounded by, and continued through a boss or enlarged portion 13 whereby a locking pin 14 may be passed through the boss and collar member into engagement with anyone of the series of openings 9 formed in the standard 8, all as will be clear from Figures 2 and 10.

Obviously, by thus slidably arranging the collar 11 upon the lower end of the standard 8, its position therefrom may be varied and locked by simply passing the pin 14 through the selected opening 9. Upon another of the sides of the collar 11 there is formed a ratchet face 15, which is adapted to be engaged by a pawl 16, pivotally supported upon a shaft 17 mounted in suitable supports not shown. A second shaft 18 is arranged in proximity to the shaft 17 and carries thereon a cam 19 which cam is positioned adjacent the pivotal pawl 16, and has a bearing thereon at times for a purpose which will be hereinafter more fully described.

As a means for elevating the bundle receiving rack 7, together with its standard 8, a foot lever 20 is pivotally supported as at 105 upon a diagonally disposed bracing strip 21, secured to one side of the frame and bent so as to be secured to the said leg 104 which is adjacent to the standard 8.

An offset portion 22 is formed upon the foot lever 20, adjacent its point of fulcrum 105, and has a bearing upon a lower end of the said collar 11 as best shown in Figure 10. Thus, when the foot lever 20 is depressed the collar 11 will be moved upwardly and should this collar be connected to the standard 8, through the medium of the locking pin 14, the said standard together with the rack 7 will be elevated, and as a consequence, any bundle, (not shown) that may be located thereon will be compressed against the lower surface 106 of the said head 24. The bundle 21 may be maintained in its elevated compressed state upon the rack 7, due to the engagement of the pivoted pawl 16, with the ratchet plate 15 formed on the collar 11, until it is desired to release the same. To the upper end of the supporting pillar 2, which as will be noted, is provided with a bracket 23, the said wire twisting head 24 is secured. This head comprises a plurality of oppositely disposed plates 107 and 108, the lower portions of which are provided with openings wherein the wire receiving and twisting means comprising the rotatable jaws or slotted pinions 25, 26 and 27 are mounted.

As will be noted, these rotatable pinions have geared teeth disposed above portions of their peripheries to facilitate the rotation thereof.

Figure 4:
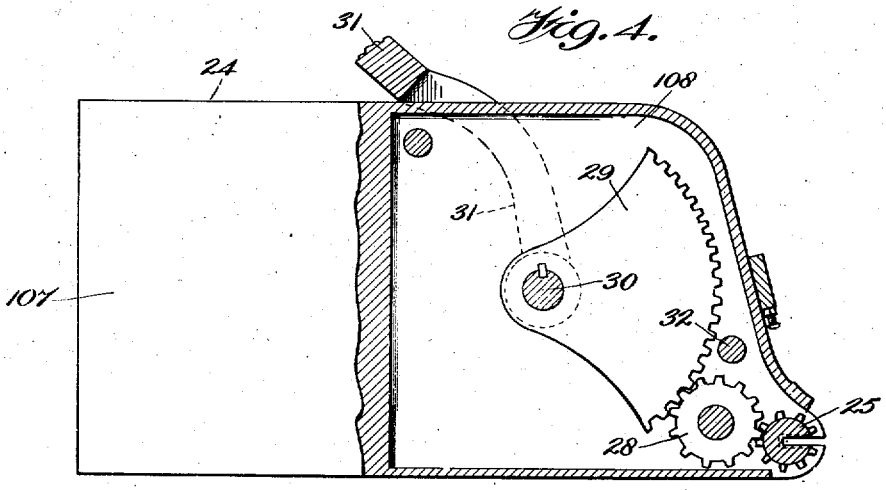
Figure 4 is a fragmentary and partial longitudinal sectional view of the said head.
Figure 6:
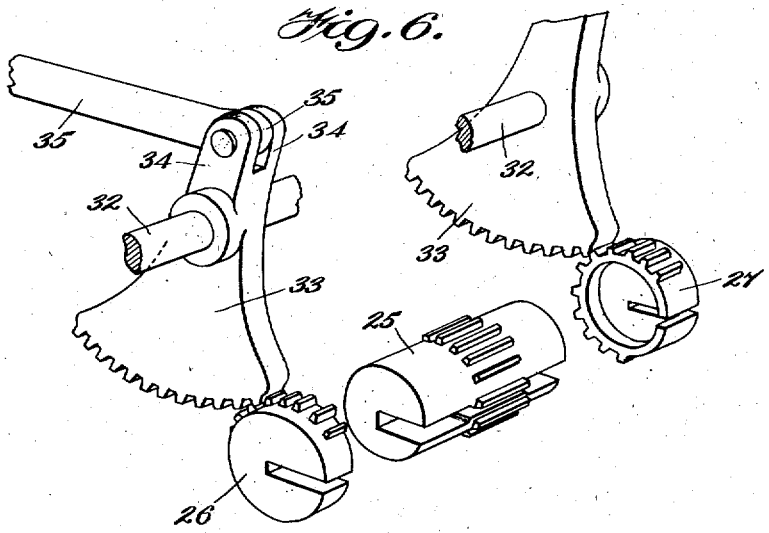
Figure 6 is a disassembled detail view in perspective showing the wire twisting or tying means of the machine.
Figure 7:
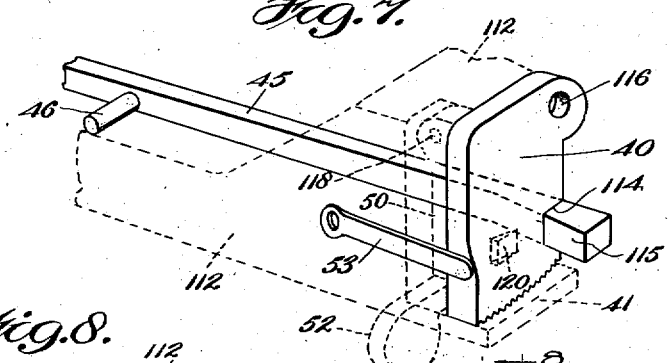
Figure 7 is a detail perspective view of a portion of the means for securing one end of the tying wire during the twisting operation.
Figure 8:
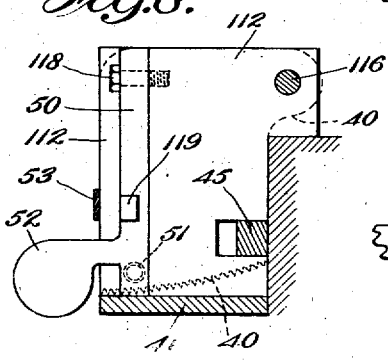
Figure 8 is a fragmentary detail view on the line 8—8 of Figure 9, looking in the direction of the arrows.
Figure 9:
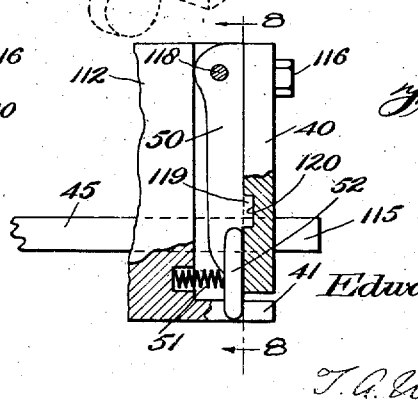
Figure 9 is a partial section taken at right angles to the plane of Figure 8; and—

A pinion 28, Figure 4, is in mesh with the rotatable gear pinion 25, and is in turn engaged by a segment 29 mounted upon a shaft 30 journaled in suitable bearings in the head 24, and this shaft has keyed thereto the operating handle 31, the lower extremity of which is bifurcated and straddles the said head, in order that the proper engagement with the shaft 30 may be effected.

Obviously, by rocking the operating handle 31 an oscillatory motion will be imparted to the rotatable pinion 25 through the medium of the said pinion 28 and segment 29. Another shaft 32 is journaled in the plates 107 and 108 of the head 24, and has keyed to its opposite ends the segments 33 which mesh with the gear teeth arranged around the peripheries of the oscillating pinions or jaws 26 and 27.

Figure 3:
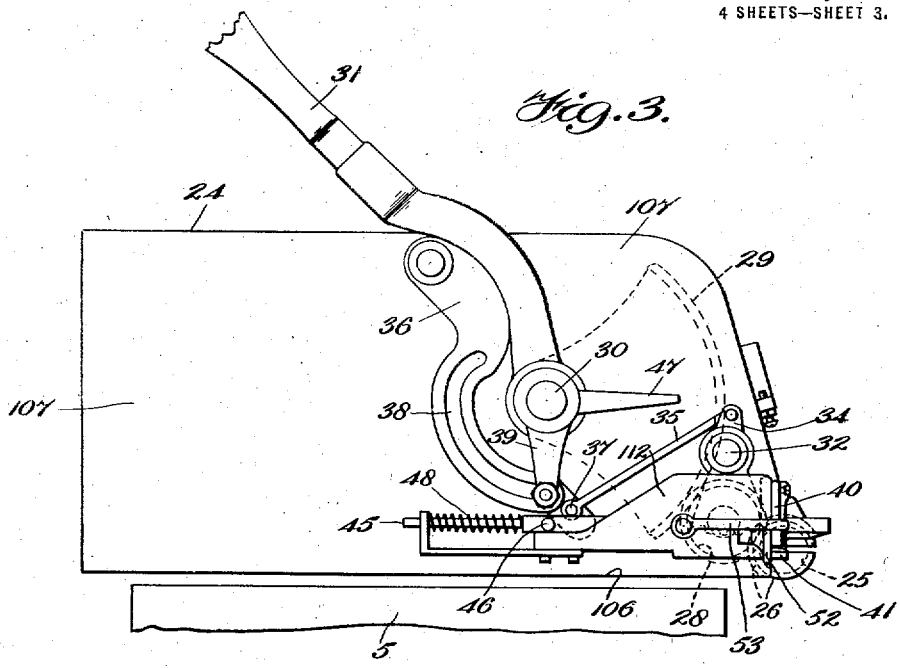
Figure 3 is a detail view in side elevation of the wire twisting or tying head of the machine.

One of the segments 33 is provided with a bifurcated extension 34 which has pivotally connected thereto an operating rod 35, pivotally connected to the lower end of the pivoted tripping arm 36, as at 37, see Figure 3. The said tripping arm is provided with a slotted way 38 formed therein, the upper end of which way is curved or cammed so as to cause a reciprocatory movement to be imparted to the rod 35, upon the rocking of the handle 31.

Figure 5:
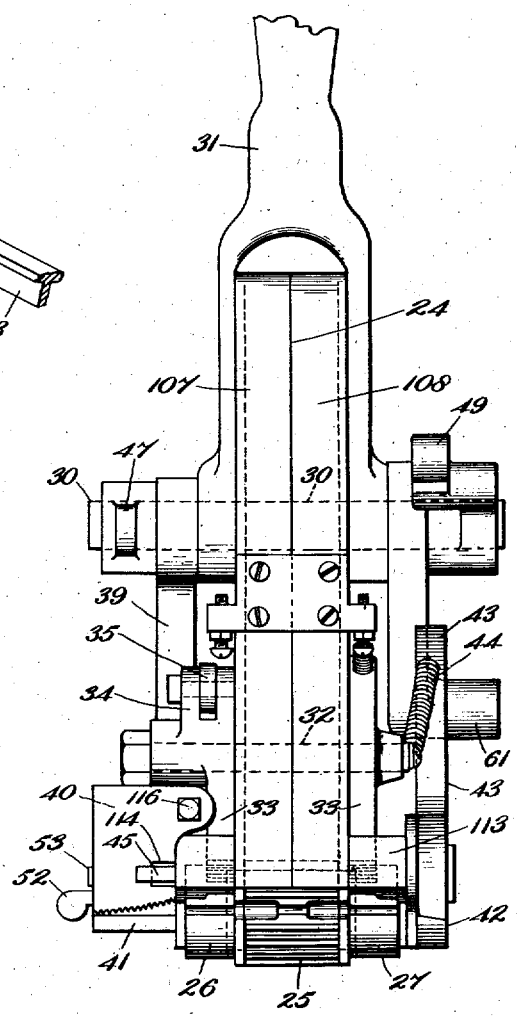
Figure 5 is a front elevational view of the head.

It should be noted in this connection that the shaft 30 to which the handle 31 is secured has keyed thereto an arm 39 carrying a roller, not shown, upon its lower end, and that this roller is receivable in the way 38 of the trip 36, see Figure 5.

To one side of the head 24, and in proximity to the rotatable jaw or pinion 26, there is pivotally mounted on the bracket or support 112, a wire gripping jaw 40. This jaw has movement relatively to a second and stationary jaw or anvil 41 for the purpose of gripping the wire as will more fully appear hereinafter.

Upon the opposite side of the said wire twisting head 24, and in close proximity to the rotatable jaw or pinion 27 there is provided a wire cutter 42 which is pivotally mounted on the lug or bracket 113, secured to the plate 108. Said wire cutter is provided with the rearwardly extending lever 43 and is normally maintained in an inoperative position by means of the tensile coiled spring 44 having one end engaged with said lever and its opposite end with the shaft 32, all as will be clear from Figures 2 and 5.

To operate the pivoted jaw 40, a bar 45 is slidably received through a recess 114 formed therein, and which bar has a wedge shaped portion 115 formed upon that end, which is adjacent the said jaw 40, while a lug 46 is formed upon the opposite end and is adapted to be intermittently engaged by a tripping leg 47, also keyed upon the shaft 30, and operated through movement of the handle 31, see Figure 3. Thus, when the bar 45 is moved forwardly due to the compression of an expansible coil spring 48, the pivotal jaw 40 will be released and permitted to securely engage one end of the tying wire between the same and the immovable anvil or jaw 41. However, upon operation of the handle 31 and engagement of the tripping leg 47 with the lug 46, the bar 45 is moved in an opposite direction causing the wedge shaped portion 115 formed thereon to force the pivotal jaw 40 outwardly on its pivot 116, and as a consequence, to release the end of the tying wire previously secured thereby.

To operate the wire cutter 42 upon the completion of the twisting or tying of the ends of the wire, a tripping leg 49, see Figures 2 and 5, is keyed upon the end of the shaft 30 opposite to the mounting of the tripping leg 47, and obviously is engaged with the adjacent end of the lever 43 upon the completion of the downward movement of the said operating handle 31.

Directly adjacent the rear side of the pivotal jaw 40 a latch 50 is pivotally mounted as at 118, upon the supporting member 112, and is normally maintained under tension by means of an expansible coil spring 51, thereby engaging a boss 119, carried by the said latch with the recess 120 formed upon the rear side of the pivotal jaw 40. Thus, the jaw 40 will be maintained in an open position subsequent to the releasing of the tying wire end therefrom; a finger piece 52 being formed upon the lower end of the latch 50 to facilitate the disengagement of the same from the pivotal jaw 40, when it is desired to again engage one end of a tying wire thereby.

To limit the outward movement of the pivotal jaw a spring 53 is secured to the supporting member 112 and has its free end lying in proximity to the outer edge of the said pivotal jaw.

Pivotally supported from the pillar as at 126 and movable over a segment 54 which is secured as at 127 to the supporting pillar 2 is a wire stretching lever 55, this lever having oppositely disposed pivoted pawls 56 mounted upon its upper face and adapted to receive the bight of the tying wire 120 therebetween; this bight of the tying wire leads to the wire supply arranged upon the rotatable reel 4. Thus by moving the lever 55 when the bight of the tying wire has been engaged between the pivoted pawls 56, the said wire may be drawn tightly about the matter to be bundled, previous to the twisting thereof. It is to be also noted that the pivoted pawls 56 carried by the wire stretching lever are so arranged as to cause the bight end of the tying wire to be passed beneath the wire cutter 42 in order that it may be severed upon the completion of the tying or twisting operation.

An operating rod 57 is arranged vertically of the machine and has its lower end connected to a lever 58 keyed to the shaft 18, Figures 2 and 10, and its remaining end pivotally connected to a bell crank lever 59 supported in bearings 60 upon the upper end of the pillar 2. A second tripping leg 61 is arranged upon the shaft 30 adjacent the tripping leg 49 and is engaged with the free end of the bell crank lever 59 upon completion of the movement of the operating handle 31, during the twisting operation. By so operating the bell crank lever 59, that is, due to engagement of the tripping leg 61 therewith, the connecting rod 57 will be pulled upwardly thereby rotating the shaft 18, and causing the cam 19 to engage a portion of the pivoted pawl 16, and force the same outwardly out of engagement with the ratchet face 15 formed upon the slidable collar 11. With the pawl 16 thus disengaged the bundle rack 7 will be permitted to return to its lowermost or normal position and the tied bundle may be then readily removed. The operation of the machine will be reviewed as follows:—

Matter to be bundled is placed upon the rack 7 while it is in its lowermost position, a tying wire supplied by the rotatable reel 4 having been previously passed thereabout. The free end of the tying wire is engaged between the movable and immovable jaws, 40 and 41, while the bights of the same coming from the supply reel 4 is passed over the cutting element 42 and between the pivoted pawls 56 of the wire stretching lever 55. The collar 11 is now properly adjusted upon the standard 8 and the foot lever 20 is depressed to cause the compressing of the matter arranged upon the rack 7, said matter engaging the head 24. After compressing the bundle, the tying wire is drawn taut about the same by rocking the wire stretching lever 55. With preparations thus made the operating handle 31 is swung forwardly upon its shaft 30 causing the rotatable wire twisting jaw 25 through which the opposite bights of the tying wire are passed to be rotated, thereby twisting the straight bights of the tying wire upon themselves due to the fact that the outer portions of the ends are engaged by the jaws 26 and 27 which to this time are not rotated.

It should be remarked, as will be clear from the expired Patent #236191, dated January 4, 1881, entitled Bale tying machine and issued to August Steiner, it is common, long prior to this invention to provide a slotted pinion capable of holding and rotating two bights of wire, while said bights are held against rotation on each side of said pinion, and to thus twist said bights together. In this case the slotted pinions or jaws 26 and 27 during the rotation of the slotted pinion 25, serve to hold against rotation said bights, as do the slots *e* in the above mentioned patent to Steiner, but they also perform an additional function as will presently appear.

Upon completion of the downward movement of the operating handle 31, the ends of the tying wire have been sufficiently twisted upon themselves to insure a secure bond and a reciprocatory movement is imparted to the rod 35 through the tripping arm 36, thus causing the segments 33 to be partially rotated whereupon the rotatable jaws 26 and 27 will be then moved to position wherein the wire receiving slots formed therein will aline with the wire receiving slot formed in the jaw 25. By so alining the wire receiving slots of the various twisting jaws the now twisted ends of the tying wire are released therefrom. Simultaneously with the rocking or oscillation of the segments 33 the tripping leg 49 is engaged with the lever 43 of the wire cutter 42, whereupon the tying wire is severed from the feed strip arranged upon the rotatable reel 4. Further, the tripping leg 61 is engaged with the free end of the bell crank lever 59 and thereby causes the cam 19 to disengage the pawl 16 from the ratchet plate 15 of the collar 11 in order that the rack 7 supporting the bundle will be permitted to move to its lowermost position. At this time, the bundle can be readily removed from the machine and other matter to be bundled placed upon the rack 7 thereof.

It will now be clear that the knot tied by this machine differs essentially from the knots tied by machines like those disclosed in Patent #1,026,754, to Lowry, et al., for example, in that the ends of the wire in the knot of this invention point in opposite directions, thus permitting the knot itself to be formed and to be located between the corners of the package and to lie down close to the surface thereof. The extreme ends of the wire can therefore be tucked down alongside the main body portion of the wire in such positions that they will not tear adjacent packages when the latter are moved during the process of transportation. In the other class of knots, on the other hand, that are produced by the above mentioned patent, both ends of the wire point in the same direction, the knot itself instead of extending parallel to and over the surface of the package as is the case in this invention, extends outwardly at a substantial angle from said surface or from the corners of the bundle, so that even when said knot is bodily bent over and made to lie close to said surface, it still forms an objectionable protuberance which is liable to tear adjacent packages during the handling thereof incident to transportation.

By the term "bight" found in the claims, I mean a part or portion of the main body of the wire.

What I claim is:—

1. In a wire tying machine the combination of means for compressing a bundle; means for holding one end of a wire while its body portion is being passed around the compressed bundle to form two overlapping bights disposed substantially parallel to and over the surface of said bundle; means for tensioning the wire after passing the same around said compressed bundle; and means located between said holding and tensioning means for twisting said bights of the wire together while under tension, substantially as described.

2. In a wire tying machine the combination of means for compressing a bundle; means for holding one end of a wire while being passed around the compressed bundle; means for tensioning the wire after passing the same around said compressed bundle; means for twisting two bights of the wire together while under tension; and means for automatically severing one of said bights after the twisting operation, substantially as described.

3. In a wire tying machine the combination of means for lifting and compressing a bundle; automatic means for holding one end of a wire while its body portion is being passed around the compressed bundle to form two overlapping bights disposed substantially parallel to and over the surface of said bundle; means for tensioning the wire after passing the same around said compressed bundle; and means comprising a slotted pinion for twisting said bights of the wire together while under tension, substantially as described.

4. In a wire tying machine the combination of means comprising a foot operated lever and connections for compressing a bundle; means for holding one end of a wire while being passed around the compressed bundle; means for tensioning the wire after passing the same around said compressed bundle; means for twisting two bights of the wire together while under tension; automatic means for releasing said wire end; and means for severing one of said bights after the twisting operation, substantially as described.

5. In a wire tying machine the combination of means for compressing a bundle; means for holding one end of a wire while being passed around the compressed bundle; means for tensioning the wire after passing the same around said compressed bundle; means for twisting two bights of the wire together while under tension; and automatic means for releasing said bundle from compression after the twisting operation, substantially as described.

6. In a wire twisting machine the combination of means to hold one end of the wire to be twisted; a pair of slotted pinions adapted to receive and hold two bights of said wire against rotation around each other; a wire twisting pinion located between said first named pinions; and means to move said first named pinions at the end of the twisting operation, substantially as described.

7. In a wire twisting machine the combination of means to hold one end of the wire to be twisted; a pair of slotted pinions adapted to receive and hold two bights of said wire against rotation around each other; a wire twisting pinion located between said first named pinions and adapted to twist together said two bights while being held by said slotted pinions; means to put said wire under tension before the twisting operation; and means to move said first named pinions at the end of the twisting operation, substantially as described.

8. In a wire tying machine the combination of automatic means to grip one end of a wire before passing the same around a package; means to twist together two bights of said wire after passing the latter around a package; and automatic means for releasing said wire end, substantially as described.

9. In a wire tying machine the combination of automatic means to grip one end of a wire before passing the same around a package; means to twist together two bights of said wire after passing the latter around a package; means for placing said wire under tension; automatic means for severing one of said bights; and automatic means for releasing said wire end, substantially as described.

10. In a wire tying machine the combination of a wire twisting means; means for supporting said wire twisting means having a smooth bottom adapted to slide relatively to the package being wired and near which said wire twisting means is positioned; means to grip one end of the wire to be twisted; and means to tension the gripped wire before the twisting operation, substantially as described.

11. In a bundling machine, a frame, article supporting and compressing means, wire receiving and feeding means, a head on the frame, wire holding and twisting means on the head, means for operating the holding and twisting means, other means operable by said operating means subsequently to the twisting of the wire for severing the same from the feeding means, and other means for releasing the twisted wire from the holding and twisting means.

12. In a bundling machine, a frame, article supporting and compressing means, wire receiving and feeding means, a head on the frame, a rotatable wire twisting jaw on the head, wire receiving jaws arranged on the opposite side of said twisting jaw, means for rotating said twisting jaw, other means engageable with said rotating means for causing rotation of said receiving jaws subsequently to rotation of the twisting jaw, and a wire cutter operable subsequently to the twisting of the wire for severing the same from the feeding means.

13. In a bundling machine, a frame, article supporting and compressing means, rotatable wire receiving and feeding means, a head on the frame, a rotatable wire twisting jaw journaled in said head, rotatable wire receiving jaws journaled upon the opposite sides of said twisting jaw, wire securing means arranged adjacent one of said receiving jaws, means for causing rotation of the receiving jaws, and further means operable by said rotating means for releasing the wire securing means subsequently to the twisting of the wire.

14. In a bundling machine, a frame, article supporting and compressing means, rotatable wire receiving and feeding means, a head on the frame, a rotatable wire twisting head on the frame, a rotatable wire twisting jaw journaled in said head, other rotatable wire receiving jaws journaled upon the opposite sides of the twisting jaw, means mounted adjacent one of said receiving jaws for securing an end of the wire, a wire cutter mounted adjacent the opposite receiving jaw, manually operable means for causing rotation of said twisting jaw, and then rotation of said receiving jaws, means engageable with said manually operable means for releasing the wire securing means, and other means engaged by the manually operable means for actuating the wire cutter.

15. In a bundling machine, a frame, a rack, vertically movable means slidable on the frame for elevating said rack, means engageable with the vertically movable means for locking the same in elevated position, a head on the frame, wire holding and twisting means on the head, means for operating the holding and twisting means, other means operable by said operating means subsequently to the twisting of the wire for severing the same from the feeding means, and a trip actuated by the operating means for releasing the rack locking means and permitting the same to move to its lowermost position.

16. In a bundling machine, a frame, a rack, a standard slidable on the frame and supporting said rack, means engageable with the standard for maintaining the same in an elevated position, a trip engageable at times with the means for maintaining the standard in elevated position, a head on the frame, a rotatable twisting jaw journaled in said head, rotatable wire receiving jaws journaled upon the opposite sides of said wire twisting jaw manually operable means for imparting rotary movement to said twisting jaw and then to said receiving jaws, a wire cutter arranged adjacent one of the receiving jaws, and actuated by the manually operable means upon completion of the twisting of the wire, and other means carried by the manually operable means engageable with said tripping means for disengaging the same from the standard and allowing said rack to move to its lowermost position.

17. In a bundling machine, rotatable wire twisting means, rotatable wire receiving jaws arranged adjacent the twisting means, means for rotating said twisting means, other means actuatable thereby for causing said receiving jaws to be rotated slightly upon rotation of said twisting means, and wire securing means engageable with the free end of the wire for holding the same during the twisting thereof, said securing means being engaged by the means for rotating the twisting means whereby to release the wire subsequently to the twisting of the same.

18. In a bundling machine, rotatable wire twisting means, rotatable wire receiving jaws arranged adjacent the twisting means, means for rotating said twisting means, other means actuatable thereby for causing slight rotation of the receiving jaws during rotation of said twisting means, wire securing means adapted to engage and retain the free end of the wire during rotation of said twisting means, and to automatically release the same subsequently to the twisting thereof, and means operable subsequently to the twisting of the wire for severing the same from a feed strip.

19. A bundling machine, including in combination with wire twisting means, a frame, a rack, vertically movable means slidable on the frame for elevating said rack, means engageable with the vertically movable means for locking the same in elevated position, and a trip actuated subsequent to operation of said wire twisting means for releasing the rack locking means and permitting the same to move to its lowermost position.

20. A bundling machine, including, in combination with wire twisting means and means for operating said twisting means, a frame, a rack, vertically movable means slidably on the frame for elevating said rack, means engageable with the vertically movable means for locking the same in elevated position, and a trip actuated by the operating means for releasing the rack locking means and permitting the same to move to its lowermost position.

21. In combination with a bundling machine, wire twisting means thereon including a head, a twisting jaw rotatably mounted in the head, wire receiving jaws rotatably mounted on the opposite sides of said first jaw, a segment mounted in the head and connected to said twisting jaw, an operating handle connected to said segment, trips carried by the operating handle, means operable upon movement of said handle to a predetermined point for imparting rotary motion to said receiving jaws, a pivoted wire securing jaw on the head adjacent one of the receiving jaws, a tapered pin slidable on the head engaged with the pivoted jaw and adapted to be engaged and moved by one of the trips carried on the handle to release said wire receiving jaws at times, and wire cutting means on the head adjacent the opposite wire receiving jaw operable by engagement of the remaining trip on said handle therewith for severing the wire from a feed strip.

22. In combination with a bundling machine wire twisting means thereon including a head, a twisting jaw rotatably mounted therein, wire receiving jaws rotatably mounted on the opposite sides of said first jaw, a segment mounted in the head and connected to said twisting jaw, a handle connected to the segment, trips carried by said handle, a curved slotted trip pivoted to one side of the head and receiving a portion of the operating arm therein, other segments engaged with said wire receiving jaws, connecting rods engaged at certain of their ends with said segments and having their remaining ends connected to said slotted trip whereby to permit the imparting of rotary motion to the receiving jaws through said last segments, at times, a pivoted wire securing jaw on the head adjacent one of the receiving jaws, a tapered slidable pin on the head engaged with the pivoted jaw and adapted to be engaged and moved by one of the trips carried on said handle to release the same, and wire cutting means on the head adjacent the remaining wire receiving jaw adapted to be engaged by the remaining trip on said handle for severing the wire.

23. In a wire tying device, in combination, a base having a slot for the reception side-by-side of the wire ends, said slot having at its ends means for holding the wires against twisting, a wire twister engaging the wires at the central part of said slot, twister operating means including a shaft journaled upon said base, a cutter adapted to engage and cut one of the wires just outside of the wire receiving slot, a cam upon said shaft, and a lever carrying said cutter and actuated by said cam to cut the wire at the completion of the wire twisting movement.

24. In a wire tying mechanism, in combination, a wire twisting mechanism, wire holders located along the wire in each direction from the twister and adapted to prevent twisting of the wire ends about each other, a wire clamp located just without one of these holders and engaging only the tip of one end of the wire, a cutter located just outside of the other holder and adapted to engage with the other end of the wire only, a wire tightening clamp located beyond the cutter from the twister, and means for connecting the twister and the cutter to operate the cutter at the completion of the twisting operation.

25. In a wire tying machine the combination of a frame; means comprising a movable member for holding two overlapping bights of the wire in a predetermined position in said frame and substantially parallel to and over the surface of the bundle being tied; means comprising a pinion having a slot for twisting the wire between its ends while so held; and means for cutting the held wire at the end of the twisting operation, substantially as described.

26. In a wire tying machine the combination of a frame; means comprising a movable member for holding two portions of the wire in a predetermined position in said frame; means comprising a pinion having a slot, and driven gear and connections for twisting the said portions of the wire between its ends while so held; and means comprising a cam and connections for cutting the held wire during the twisting operation, substantially as described.

27. In a wire tying machine the combination of a frame having a smooth bottom; movable means for holding a wire in a predetermined position; means for tensioning said wire while so held; means for twisting two bights of said wire together while under tension; and means for cutting one of said bights after the twisting operation, substantially as described.

28. In a wire tying machine the combination of means for holding two overlapping bights of a wire in a predetermined position substantially parallel to and over the surface of the bundle being tied; means for tightening said wire while so held; means comprising a shaft and a gear for twisting parts of said wire together while under tension; and means operated by said shaft for cutting the wire during the twisting operation, substantially as described.

29. In a wire tying machine the combination of means for holding two overlapping bights of a wire in a predetermined position substantially parallel to and over the surface of the bundle being tied; means for tightening said wire while so held; means comprising a lever, a shaft and gear connections operated by said lever for twisting parts of said wire together while under tension; and means comprising a cam carried by said shaft for cutting the wire during the twisting operation, substantially as described.

30. In a wire tying machine the combination of a frame having a smooth bottom and provided with a dog; wire holding members having slots for holding two portions of a wire against a turning movement; a cutter carried by said frame; a wire tensioning means also carried by said frame; a wire twisting means; an operating lever; and connections whereby when said lever is operated said two portions of said wire will be twisted together and one of said portions cut in two, substantially as described.

31. In a wire tying machine the combination of a frame provided with a dog and slots for holding two portions of a wire in a predetermined position; a cutter carried by said frame; a wire tensioning means also carried by said frame; a gear train comprising a slotted wire twisting member; an operating lever; and connections between said cutter and said lever, and between said gear train and said lever, whereby when said lever is operated said two portions of said wire will be twisted together and one of said portions cut in two, substantially as described.

32. In a wire tying machine the combination of a frame having a smooth bottom; means comprising a pinion having a single slot for twisting two parts of a wire together; means for tensioning said wire before said parts are twisted; and means for cutting one of said parts at the end of the twisting operation, substantially as described.

33. In a wire tying machine the combination of means for twisting two parts of a wire together; means for retaining said wire in place during the twisting operation; means for tensioning said wire before said parts are twisted; means for automatically releasing said retaining means; and means for cutting one of said parts at the end of the twisting operation, substantially as described.

34. In a wire tying machine the combination of a wire clamping means; a wire twisting means; a wire cutting means; and a single operating lever for actuating in a single throw said wire clamping, wire twisting and wire cutting means, substantially as described.

35. In a wire tying machine the combination of means for holding two bights of a wire in a predetermined position; means for twisting a portion of said two bights together; and means for automatically cutting off one of said bights at the end of the twisting operation, substantially as described.

36. In a machine adapted to twist together parallel disposed bights of wire with their ends pointing in opposite directions, the combination of means for holding said bights substantially parallel to and over the surface of the bundle being wired; separated means for preventing portions of said bights from being twisted together; a twisting means located between said separated means adapted to twist together while still substantially parallel to said surface another portion of said bights; and means to automatically cut one of said bights after they have been twisted together, substantially as described.

37. In a machine adapted to twist together parallel disposed bights of wire with their ends pointing in opposite directions; the combination of means for holding said bights substantially parallel to and over the surface of the bundle being wired; separated means for preventing portions of said bights from being twisted together; twisting means disposed between said separated means for twisting together other portions of said bights; means for severing one of said bights; and means for automatically operating said severing means after said bights have been twisted together, substantially as described.

38. In a machine adapted to twist together parallel disposed bights of wire with their ends pointing in opposite directions; the combination of means comprising a clamp for securing one of said ends and holding said bights substantially parallel to and over the surface of the bundle being wired; separated slotted means for holding portions of said bights from being twisted together; twisting means disposed between said separated means for twisting together other portions of said bights; means for severing one of said bights; and means for automatically operating said severing means after said bights have been twisted together, substantially as described.

In testimony whereof, I affix my signature.

IOLA HATCH,
*Executrix of estate of Edward Hatch, deceased.*

By FRED A. DOUTY,
*Assignee of entire interest.*